G. NEUBERG & L. KRAMER.
MOTOR BOAT.
APPLICATION FILED AUG. 8, 1918

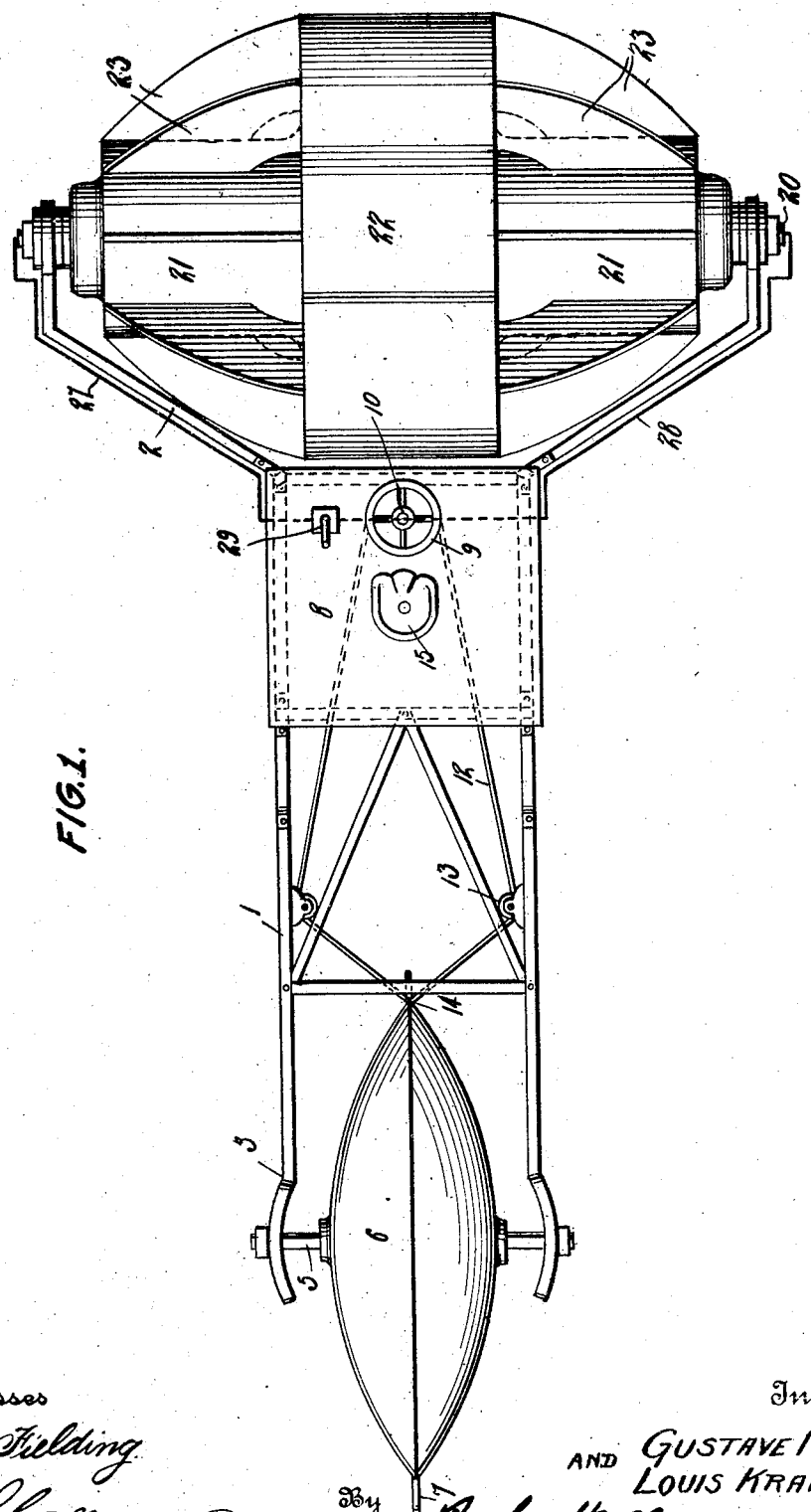

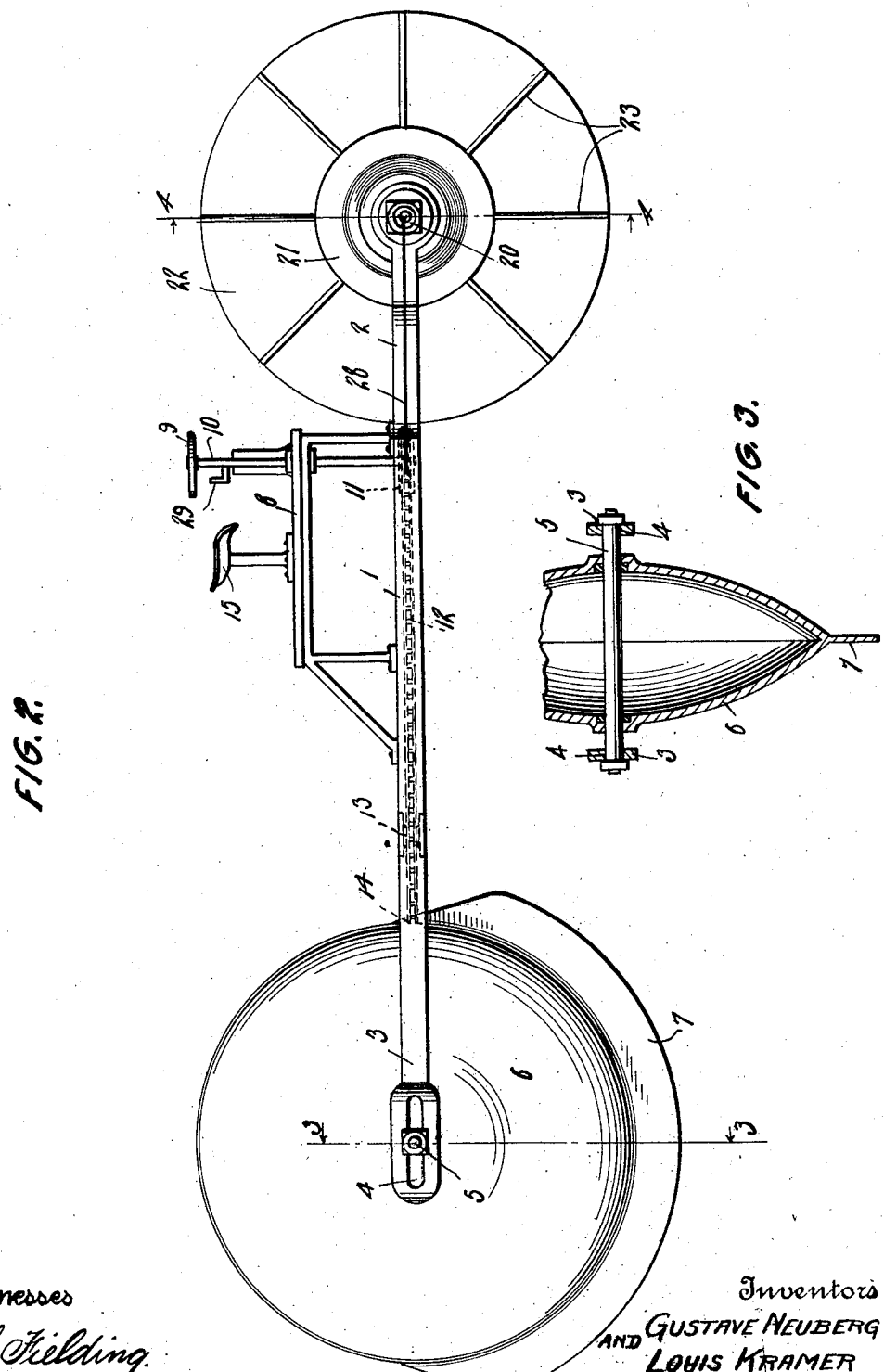

1,293,167.

Patented Feb. 4, 1919.
3 SHEETS—SHEET 3.

Witnesses
W. C. Fielding
N. L. Collamer

Inventors
GUSTAVE NEUBERG
AND LOUIS KRAMER
By Richard Bowen, Attorney

UNITED STATES PATENT OFFICE.

GUSTAVE NEUBERG AND LOUIS KRAMER, OF CHICAGO, ILLINOIS.

MOTOR-BOAT.

1,293,167.

Specification of Letters Patent.

Patented Feb. 4, 1919.

Application filed August 8, 1918. Serial No. 248,972.

*To all whom it may concern:*

Be it known that we, GUSTAVE NEUBERG, a citizen of the United States, and LOUIS KRAMER, a citizen of Holland, both residing at Chicago, in the county of Cook and State of Illinois, have invented certain new and useful Improvements in Motor-Boats, of which the following is a specification.

This invention relates to ships, and more especially to paddle wheelers, and the object of the same is to produce a motor driven vessel controlled by a single operator and intended particularly to carry a number of mines or bombs.

The purpose of the invention is to permit the operator to control the craft, head it for an enemy and jump off and swim away from the same, after which the motor continues to run until the craft smashes into the enemy and explodes the bombs which are contained within its hollow paddle wheel. One feature of our invention lies in the lightness, simplicity, and compactness of the structure, enabling it to be built cheaply, carried on ship board, put over when it is to be used, and manned by a single operator as explained below. Details of the preferred construction of the invention are set forth below, and reference is made to the drawings wherein :—

Figure 1 is a plan view, and

Fig. 2 a side view of the machine complete.

Fig. 3 is a sectional detail on the line 3—3 of Fig. 2, and

Fig. 4 is a sectional detail on the line 4—4 of Fig. 2, while

Figure 5:
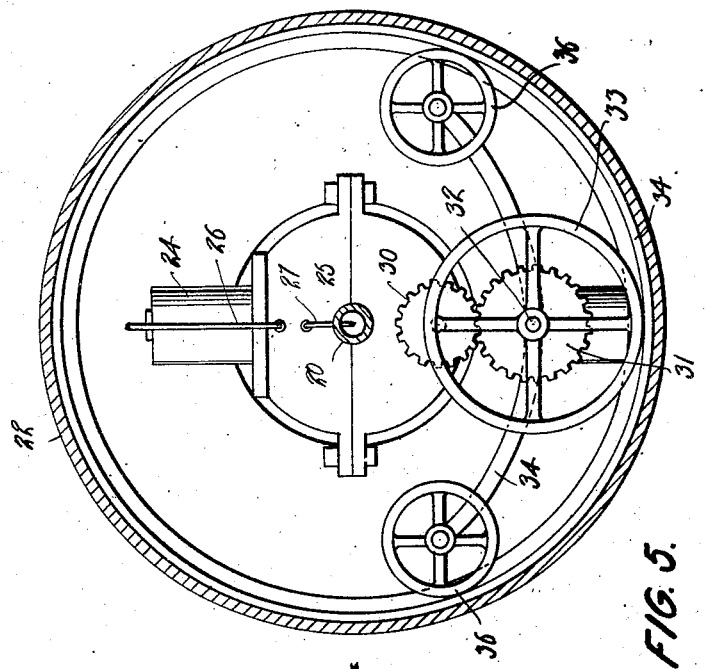
Fig. 5 is a cross section on the line 5—5 of Fig. 4.
Figure 4:
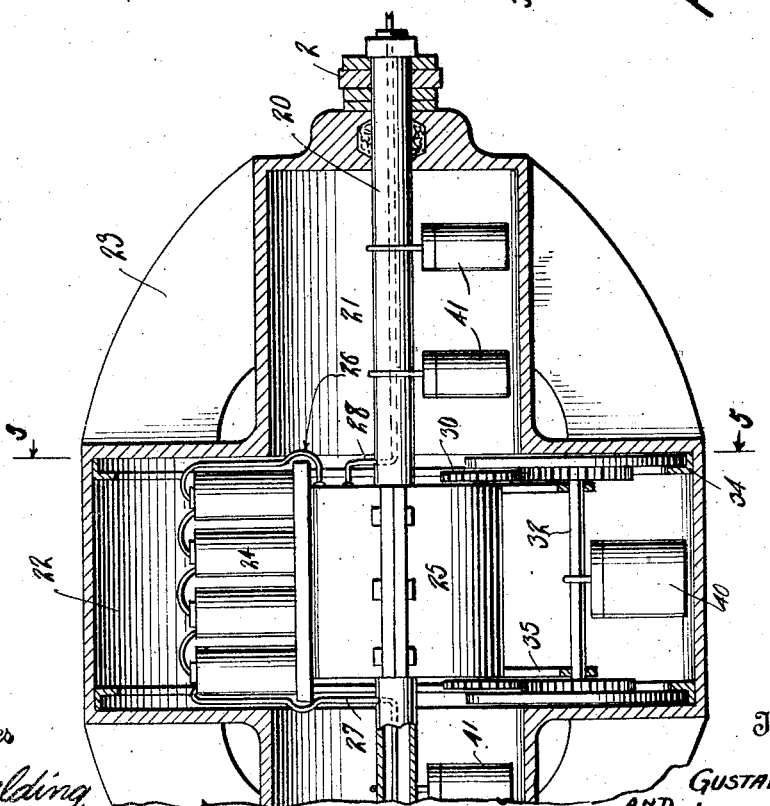

A light skeleton framework 1 carries at its front end a large fork 2 containing the paddle wheel described below and at its rear end another fork 3 whose arms are slotted as shown at 4 to receive the ends of a shaft 5 which extends fixedly through the rudder. The latter is made in the shape of a float 6 mounted on said shaft, and a keel 7 underlies this float. A bridge 8 is built upon the framework and preferably provided with a seat for the operator, and adjacent the same is a steering wheel 9 from which depends a shaft 10 having a sprocket 11 at its lower end. Around the sprocket passes a chain 12 which leads to the rear over pulleys 13 and is connected at the point 14 with the front end of the float 6. Therefore when the operator on the seat 15 turns the steering wheel 9, the front end of the float is swung from side to side and the extremities of its shaft 5 move in the slots 4. Thus the operator is enabled to guide the machine by setting the keel at an angle to the longitudinal line of the framework, and meanwhile the float 6 sustains the rear end of said framework in a manner which will be clear.

The arms of the large front fork 2 are connected by a tubular cross shaft 20 which is fixed, and rotatably mounted on this shaft is the paddle wheel which has drum-like ends 21, a circumferentially enlarged center 22, and a series of blades or paddles 23 as shown. Fixedly mounted at the center of a shaft 21 is a motor, broadly indicated by the numeral 25, and by preference this is an electric motor driven from a storage battery 24. The wire 26 from one end of this battery leads to the motor and thence at 27 through one end of the shaft, while the wire 28 from the other end of the battery leads to the other end of the shaft, both wires leading thence to a controller 29 within reach of the operator sitting on the seat 15.

The numeral 30 has been applied to the driving gears of the motor. These mesh with driven gears 31 which are fast on an axle 32 carrying at its extremities wheels 33 traveling on tracks 34 within the enlarged central portion 22 of the drum. The axle carries a frame 35 projecting both in front and in rear of it, and this frame carries guide wheels 36 also traveling on said tracks. By this means the carrier driven structure is centered beneath the motor, and when the latter runs the power is transmitted through the tracks 34 to the drum, and the latter caused to rotate. In other words, the transmitting mechanism is a truck traveling on the track in the drum and standing ever at the bottom of the latter, while the drum rotates around the truck and the motor, and its paddles 23 enter the water. This truck is ballasted so that it is caused to remain at the bottom of the drum, by hanging from its shaft 32 one or more heavy bombs or explosives, and others may be hung on the main shaft 20 as shown at 41. The size and buoyancy of the drum is sufficient to support the explosives besides the power mechanism.

When now this device is to be used, it is put into the water and its forward end is supported by the drum while its rear end is supported by the buoyant rudder mechanism. A single operator (he should always wear a life preserver) mounts the bridge and takes his seat at 15, and if the parts are built properly the framework 1 will be just about flush with the surface of the water. Manipulating the controller 29, he applies current from the source of power 24 to the motor 25, and the latter begins to run; its driving gears 30 transmit motion through the truck mechanism to the rails or tracks 34 within the drum, and the latter rotates. The paddles 23 now cause progress of the structure through the water, and meanwhile the operator can guide the craft by means of the hand wheel 9 and the steering mechanism described above. It is possible to erect a barrier around the bridge 8 so as to protect the operator from sharpshooters; and, in fact, a considerable structure may be built on the framework, instead of simply a bridge 8 as indicated in outline in Fig. 1. But we prefer to retain the lightness of structure as well as simplicity as far as possible, because it is our intention that after the operator has started the mechanism and set its course toward the enemy vessel, he shall jump off and swim back to the home ship or place from which he started, and of course the motor will continue to drive the paddle wheel and cause the continued progress of this craft toward its destination. When it strikes, the several bombs 40 and 41 will be either thrown from their supports or so violently agitated that they will explode, and for this reason they should be of proper structure whose details are not part of this invention. We may suggest as one expedient that each bomb could carry a cup of acid, the cup being only partly filled so that the acid shall not spill under the buffeting to which the craft is subjected by the waves; but when a violent shock occurs and the acid is spilled it may cause an explosion in a suitable manner. In closing we want to add a suggestion that, whereas we propose to employ this device for water, it is quite possible that without the bombs it could be used as a pleasure boat, a toy, or a water velocipede as it were; and we reserve the widest latitude in the uses to which it may be put.

The foregoing description and the drawings have reference to what may be considered the preferred, or approved form of our invention. It is to be understood that we may make such changes in construction and arrangement and combination of parts, materials, dimensions, et cetera, as may prove expedient and fall within the scope of the appended claims.

Having thus fully described our invention, what we claim as new and desire to secure by Letters Patent, is:—

1. The herein described water craft comprising a framework having a fork at its front end, steering mechanism at its rear end, a shaft fixedly connecting the arms of said fork, a motor rigidly carried at the mid-length of said shaft, a drum rotatably mounted around the shaft and having peripheral paddles, and connections between said motor and drum.

2. The herein described water craft comprising a framework having a fork at its front end, steering mechanism at its rear end, a shaft fixedly connecting the arms of said fork, a motor rigidly carried at the mid-length of said shaft, a drum rotatably mounted around the shaft and having peripheral paddles and containing an internal track, a truck having a wheel traveling on said track, and connections between the shaft of said wheel and the motor.

3. The herein described water craft comprising a framework having a fork at its front end, steering mechanism at its rear end, a shaft fixedly connecting the arms of said fork, a motor rigidly carried at the mid-length of said shaft, a drum rotatably mounted around the shaft and having internal tracks near its center, a truck having a pair of wheels traveling on said tracks and fixed on a common axle, a frame carried by said axle and carrying guide wheels also running on said tracks, a driven gear fast on said axle, and a driving gear on the power-shaft of said motor meshing therewith.

4. In a water craft, the combination with the frame structure having a fork at its front end and steering mechanism at its rear end; of a shaft fixedly connecting the fork-arms, an electric motor fixedly mounted on the center of the shaft and having a driving gear, a drum rotatably mounted on said shaft and carrying peripheral paddles and enlarged at its longitudinal center to inclose said motor, tracks within said enlargement, a truck whose wheels travel on said tracks, and connections between the axle of said wheels and the driving gear of said motor.

5. In a water craft, the combination with a framework having steering mechanism at its rear end and a fork at its front end, a bridge on said framework, and an electric controller on said bridge; of a tubular axle fixedly connecting the fork-arms, a motor whose casing is fixedly carried by the mid-length of said axle, a battery connected with said motor, the connecting wires leading out said shaft and through said controller, and connections between the driving shaft of said motor and the interior of said drum.

6. In a water craft of the type described, the combination with a framework having a fork at its front end and a bridge for the operator, steering mechanism upon the bridge, and a rudder connected with said mechanism; of a drum rotatably mounted within said fork and having a self-contained motor, and control mechanism therefor leading to the bridge, the drum being rotatably mounted on a fixed shaft.

In testimony whereof we affix our signatures in presence of two witnesses.

GUSTAVE NEUBERG.
LOUIS KRAMER.

Witnesses:
LILLIAN SEBASTIAN,
LAURETTA CAREY.

Copies of this patent may be obtained for five cents each, by addressing the "Commissioner of Patents, Washington, D. C."